(12) United States Patent
Song et al.

(10) Patent No.: US 12,410,965 B2
(45) Date of Patent: Sep. 9, 2025

(54) INTERNAL CIRCULATION TYPE CLATHRATE HYDRATE-BASED COLD STORAGE SYSTEM AND METHOD

(71) Applicant: DALIAN UNIVERSITY OF TECHNOLOGY, Liaoning (CN)

(72) Inventors: Yongchen Song, Liaoning (CN); Yuan Lv, Liaoning (CN); Lunxiang Zhang, Liaoning (CN); Chuanxiao Cheng, Liaoning (CN); Mingjun Yang, Liaoning (CN); Yu Liu, Liaoning (CN); Fan Wang, Liaoning (CN); Lei Yang, Liaoning (CN); Yi Zhang, Liaoning (CN); Zheng Ling, Liaoning (CN); Yanghui Li, Liaoning (CN); Cong Chen, Liaoning (CN); Peng Wu, Liaoning (CN); Bingbing Chen, Liaoning (CN)

(73) Assignee: DALIAN UNIVERSITY OF TECHNOLOGY, Liaoning (CN)

(*) Notice: Subject to any disclaimer, the term of this patent is extended or adjusted under 35 U.S.C. 154(b) by 0 days.

(21) Appl. No.: 18/833,379

(22) PCT Filed: Dec. 9, 2022

(86) PCT No.: PCT/CN2022/138007
§ 371 (c)(1),
(2) Date: Jul. 25, 2024

(87) PCT Pub. No.: WO2023/142718
PCT Pub. Date: Aug. 3, 2023

(65) Prior Publication Data
US 2025/0146731 A1    May 8, 2025

(30) Foreign Application Priority Data
Jan. 25, 2022 (CN) .......................... 202210084764.8

(51) Int. Cl.
*F25D 16/00* (2006.01)
*F24F 5/00* (2006.01)
*F28D 20/02* (2006.01)

(52) U.S. Cl.
CPC ............ *F25D 16/00* (2013.01); *F24F 5/0021* (2013.01); *F28D 20/021* (2013.01);
(Continued)

(58) Field of Classification Search
CPC .............................. F24F 5/0021; F25D 16/00
See application file for complete search history.

(56) References Cited

U.S. PATENT DOCUMENTS

| | | | | |
|---|---|---|---|---|
| 4,596,120 A | * | 6/1986 | Knodel | F25D 16/00 62/434 |
| 4,827,735 A | * | 5/1989 | Foley | F25D 16/00 62/434 |

(Continued)

FOREIGN PATENT DOCUMENTS

| | | |
|---|---|---|
| CN | 2909071 | 6/2007 |
| CN | 101650065 | 2/2010 |

(Continued)

*Primary Examiner* — Christopher R Zerphey
(74) *Attorney, Agent, or Firm* — Ming Jiang; OPENPTO US LLC

(57) ABSTRACT

A cold storage system and method are provided. The cold storage system includes a chiller, a hydrate-based cold storage tank, a gas disturbance generator, a concentration detector, a heat exchanger, a direct-current power supply and circuit controller, and a system monitor. Chiller provides a secondary refrigerant at a low temperature. The secondary refrigerant flows through a coil in the hydrate-based cold storage tank for a heat exchange. The gas disturbance generator induces hydrate nucleation. The concentration detector monitors a concentration of a hydrate solution in real time. The heat exchanger is equipped with a finned tube heat exchanger with a fan, to improve the cold supply (Continued)

efficiency of the cold storage system. The system monitor monitors a state change of the system in real time through a set of temperature-pressure sensor modules. Several cold energy supply modes can be realized in the present disclosure by adjusting opening/closing of valves.

10 Claims, 3 Drawing Sheets

(52) U.S. Cl.
CPC .... *F28D 20/028* (2013.01); *F24F 2005/0032* (2013.01); *Y02E 60/14* (2013.01)

(56) References Cited

U.S. PATENT DOCUMENTS

| | | | | |
|---|---|---|---|---|
| 6,553,776 B2* | 4/2003 | Satoh | ............... | F25C 1/08 |
| | | | | 62/135 |
| 7,089,756 B2* | 8/2006 | Hu | ............... | F25B 25/00 |
| | | | | 62/99 |
| 11,970,652 B1* | 4/2024 | Grieve | ............... | C09K 5/063 |

FOREIGN PATENT DOCUMENTS

| | | |
|---|---|---|
| CN | 114413364 | 4/2022 |
| JP | 2001280875 | 10/2001 |
| JP | 2003021366 | 1/2003 |
| JP | 2015210025 | 11/2015 |

* cited by examiner

INTERNAL CIRCULATION TYPE CLATHRATE HYDRATE-BASED COLD STORAGE SYSTEM AND METHOD

CROSS-REFERENCE TO RELATED APPLICATION

This application is a 371 of international application of PCT application serial no. PCT/CN2022/138007 filed on Dec. 9, 2022 which claims the priority benefit of China application no. 202210084764.8 filed on Jan. 25, 2022. The entirety of each of the above mentioned patent applications is hereby incorporated by reference herein and made a part of this specification.

SUMMARY

Technical Problem

The technical problem to be solved by the present disclosure is to overcome the deficiencies of slow hydrate nucleation and low energy storage conversion rate in the existing cold storage systems.

Solutions to the Problems

Technical Solutions

An internal circulation type clathrate hydrate-based cold storage system is provided, including a chiller, a first solution pump, a first flow meter, a first one-way valve, a first two-way valve, a second one-way valve, a second solution pump, a heat exchanger, a third one-way valve, a fourth one-way valve, a second flow meter, a system monitori, a direct-current power supply and circuit controller, a concentration detector, a second gas pump, a second two-way valve, a gas distributor, a hydrate-based cold storage tank, a gas disturbance generator, a first branch pipeline, a second branch pipeline, a third branch pipeline, a fourth branch pipeline, a fifth branch pipeline, and a temperature sensor group, where an outlet end of the chiller is in communication with an inlet of the heat exchanger through the first branch pipeline, and an inlet end of the chiller is in communication with an outlet of the heat exchanger through the second branch pipeline; the first solution pump, the first flow meter, the first one-way valve, the second one-way valve, and the second solution pump are sequentially arranged on the first branch pipeline along a flow direction of a secondary refrigerant; the third one-way valve, the fourth one-way valve, and the second flow meter are sequentially arranged on the second branch pipeline along the flow direction of the secondary refrigerant; the hydrate-based cold storage tank is a sealed container filled therein with a hydrate-based cold storage working medium, and a coil is arranged in the hydrate-based cold storage tank and immersed in the hydrate-based cold storage working medium; the temperature sensor group is arranged in the hydrate-based cold storage tank, and a terminal of the temperature sensor group is connected to the system monitori; the first branch pipeline between the first one-way valve and the second one-way valve is in communication with a first end of the coil through the third branch pipeline, and the second branch pipeline between the third one-way valve and the fourth one-way valve is in communication with a second end of the coil through the fourth branch pipeline; the first two-way valve is arranged on the third branch pipeline, and the second two-way valve is arranged on the fourth branch pipeline; the fifth branch pipeline is arranged outside the hydrate-based cold storage tank, an upper end of the fifth branch pipeline is in communication with a top of an inner wall of the hydrate-based cold storage tank, a lower end of the fifth branch pipeline is connected to the gas distributor, the gas distributor is connected to the gas disturbance generator arranged in the hydrate-based cold storage tank through a hose, the second gas pump is arranged on the fifth branch pipeline, and the fifth branch pipeline is a thermal insulation pipe; and a heat exchanger is arranged in the heat exchanger; and the direct-current power supply and circuit controller for controlling a system power supply is arranged in the internal circulation type clathrate hydrate-based cold storage system.

Preferably, the internal circulation type clathrate hydrate-based cold storage system further includes a first pressure sensor, a first temperature sensor, a second pressure sensor, and a second temperature sensor, where the first pressure sensor and the first temperature sensor are arranged on the third branch pipeline and are located on a side close to the coil; the second pressure sensor and the second temperature sensor are arranged on the fourth branch pipeline and are located on a side close to the coil; and the first pressure sensor, the first temperature sensor, the second pressure sensor, and the second temperature sensor are each connected to the system monitor through a temperature-pressure sensor module.

Preferably, the internal circulation type clathrate hydrate-based cold storage system further includes the concentration detector, a solid-liquid separator, and an automatic sampler, where the concentration detector is connected to the solid-liquid separator through a first pipeline, the solid-liquid separator is connected to the automatic sampler through a second pipeline, and the automatic sampler is in communication with the hydrate-based cold storage working medium in the hydrate-based cold storage tank through a third pipeline.

Preferably, the concentration detector includes a data acquisition and analysis terminal, a concentration measurement probe, a sample solution, and a test bottle, where the test bottle is connected to the solid-liquid separator through the first pipeline, the sample solution is placed in the test bottle, a first end of the concentration measurement probe is connected to the data acquisition and analysis terminal, and a second end of the concentration measurement probe is penetrated into the sample solution in the test bottle.

Preferably, the hydrate-based cold storage working medium in the hydrate-based cold storage tank is one selected from a group consisting of an alkane hydrate, a carbon dioxide hydrate, a water-soluble organic hydrate, and a mixed hydrate.

Preferably, a formula for calculating a cold storage capacity in the hydrate-based cold storage tank is:

$$Q = \rho q_m c \Delta T$$

where ρ is a density of a solution of the secondary refrigerant, $q_m$ is a mass flow rate of the solution of the secondary refrigerant flowing through an inlet and an outlet of the hydrate-based cold storage tank, C is a specific heat capacity of the solution of the secondary refrigerant, and ΔT is a heat transfer temperature difference of the solution of the secondary refrigerant between the inlet and the outlet of the hydrate-based cold storage tank.

Preferably, the internal circulation type clathrate hydrate-based cold storage system further includes a crystallization promoting assembly and a first gas pump, where the crystallization promoting assembly is in communication with an interior of the hydrate-based cold storage tank through a fourth pipeline, and the first gas pump is arranged on the fourth pipeline between the crystallization promoting assembly and the hydrate-based cold storage tank.

Preferably, the crystallization promoting assembly includes a thermal insulation cotton, a volumetric flask, and hydrate particles, where the hydrate particles are contained in the volumetric flask, the thermal insulation cotton is wrapped outside the volumetric flask, and the volumetric flask is in communication with the interior of the hydrate-based cold storage tank through the fourth pipeline.

Preferably, the temperature sensor group arranged in the hydrate-based cold storage tank includes a third temperature sensor, a fourth temperature sensor, a fifth temperature sensor, and a sixth temperature sensor, where the third temperature sensor is mounted at a bottom of the hydrate-based cold storage tank, the fourth temperature sensor is mounted at a central position of the hydrate-based cold storage tank, the fifth temperature sensor is mounted in the hydrate-based cold storage tank and close to a wall surface of the hydrate-based cold storage tank, and the sixth temperature sensor is mounted on a top air side of the hydrate-based cold storage tank.

The present disclosure further provides an internal circulation type clathrate hydrate-based cold storage method, including:

cold storage stage at night: the chiller providing the secondary refrigerant at a low temperature, and the secondary refrigerant being conveyed by the first solution pump to the hydrate-based cold storage tank through the first flow meter, the first one-way valve, and the first two-way valve, and exchanging heat with the hydrate-based cold storage working medium through the coil for a heat exchange and fully absorbing the heat in the hydrate-based cold storage tank for a hydrate-based phase change energy storage; after the heat exchange being completed, the secondary refrigerant flowing back to the chiller through the second two-way valve, the fourth one-way valve, and the second flow meter, and being cooled again to complete a cold storage cycle; after the cold storage cycle starting, the crystallization promoting assembly introducing hydrate particles into the hydrate-based cold storage tank through the first gas pump to induce a rapid nucleation of the hydrate-based cold storage working medium, and meanwhile, cold air from a top of the hydrate-based cold storage tank being pumped by the second gas pump to the gas distributor for a gas distribution, then being conveyed to the gas disturbance generator for a continuous gas disturbance, and then being pumped by the second gas pump again for a gas internal circulation to reduce a loss of a cold load and accelerate an energy storage; the system monitor monitoring a temperature change before and after absorbing the heat by the secondary refrigerant, a temperature change of the hydrate-based cold storage working medium, and a temperature change in the hydrate-based cold storage tank in real time; and cold energy supply stage in daytime:

a mode of cold energy supply by the hydrate-based cold storage tank alone: the secondary refrigerant in the hydrate-based cold storage tank being pumped by the second solution pump to the heat exchanger through the first two-way valve and the second one-way valve, fully absorbing heat in the heat exchanger through a finned tube heat exchanger with a fan, then flowing back to the hydrate-based cold storage tank through the third one-way valve and the second two-way valve, and being cooled again through a heat exchange with the hydrate-based cold storage working medium at a low temperature in the coil to complete a cold energy supply cycle;

a mode of cold energy supply by the chiller alone: the chiller providing the secondary refrigerant, and the secondary refrigerant being pumped by the first solution pump to the finned tube heat exchanger in the heat exchanger through the first flow meter, the first one-way valve, the second one-way valve, and the second solution pump for a heat absorption, and then flowing back to the hydrate-based cold storage tank through the third one-way valve, the fourth one-way valve, and the second flow meter to be cooled again to complete a cold energy supply cycle; and a mode of cold energy supply by the hydrate-based cold storage tank in combination with the chiller: the chiller and the hydrate-based cold storage tank simultaneously providing the secondary refrigerant, the secondary refrigerant being pumped by the first solution pump and the second solution pump to the heat exchanger, the finned tube heat exchanger with the fan operating at a full load to allow the secondary refrigerant at a low temperature to fully absorb heat in the heat exchanger, then a part of the secondary refrigerant flowing back to the hydrate-based cold storage tank and being cooled to the low temperature again through a heat exchange with the hydrate-based cold storage working medium at the low temperature via the coil, and the other part of the secondary refrigerant flowing back to the chiller and being cooled again to complete a combined cold energy supply cycle.

Advantages of the Present Disclosure

Advantages

The gas disturbance generator at the bottom of the hydrate-based cold storage tank creates gas disturbance on the hydrate-based cold storage working medium in the hydrate-based cold storage tank, so as to induce the hydrate nucleation and accelerate energy storage. With the use of the intelligent crystallization promoting assembly, when the temperature in the hydrate-based cold storage tank reaches a required working condition of hydrate nucleation, an appropriate amount of small hydrate particles are added to the hydrate solution to promote the large-scale crystallization of the hydrate and improve the crystallization efficiency. The energy storage conversion rate and the cooling capacity are improved by the coil in the hydrate-based cold storage tank and the finned tube heat exchanger with the fan in the heat exchanger. Through the internal circulation design, cold air in the top of the hydrate-based cold storage tank is pumped to the gas distributor by the second gas pump, and then distributed to the gas disturbance generator at the bottom for gas disturbance. In this way, the internal circulation of air in the hydrate-based cold storage tank is realized, to prevent heat exchange between outside hot air and the hydrate-based cold storage tank, thereby reducing extra consumption of electric energy in the cold storage process and improving the energy storage efficiency and the cost-effectiveness.

In addition, the present disclosure provides a complete cold charge-cold discharge system, where the chiller stores cold energy at night, and supplies cold energy to the heat exchanger through the hydrate-based cold storage tank during daytime. In addition, three functions can be realized according to different requirements on the cooling capacity: cold energy supply by the hydrate-based cold storage tank, cold energy supply by the chiller, and cold energy supply by the chiller and the hydrate-based cold storage tank, thereby broadening the range of usage scenarios of the internal circulation type clathrate hydrate-based cold storage system. To sum up, according to the present disclosure, latent heat generated during phase change of the clathrate hydrate is fully utilized. In addition, according to the memory effect of the clathrate hydrate serving as the hydrate-based cold storage working medium, higher nucleation rate and cold storage capacity can be achieved after several times of cold charge-cold discharge. Therefore, the present disclosure has the advantages of high efficiency, energy saving, and long-term stable operation, and is especially suitable for scenarios that require continuous cold energy supply.

BRIEF DESCRIPTION OF THE DRAWINGS

Description of the Drawings

Figure 1:
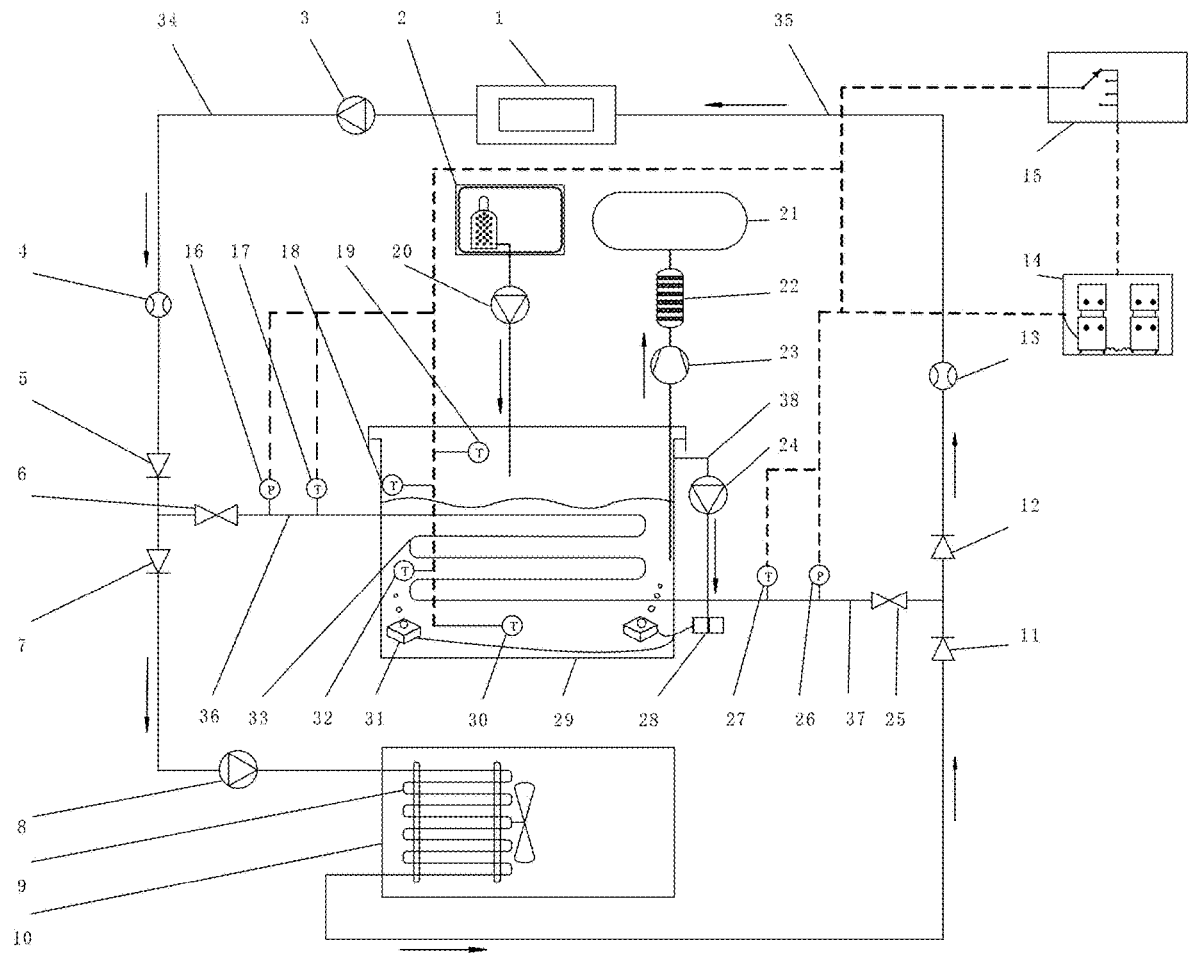
Figure 2:
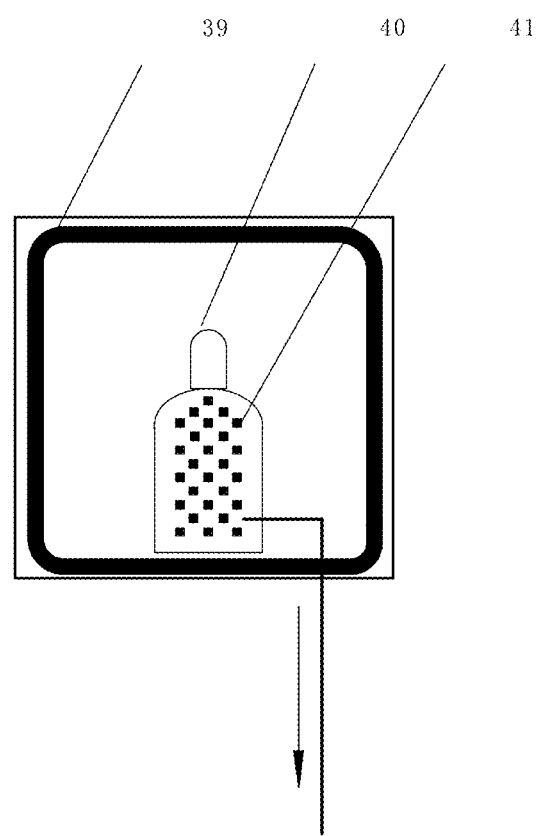
Figure 3:
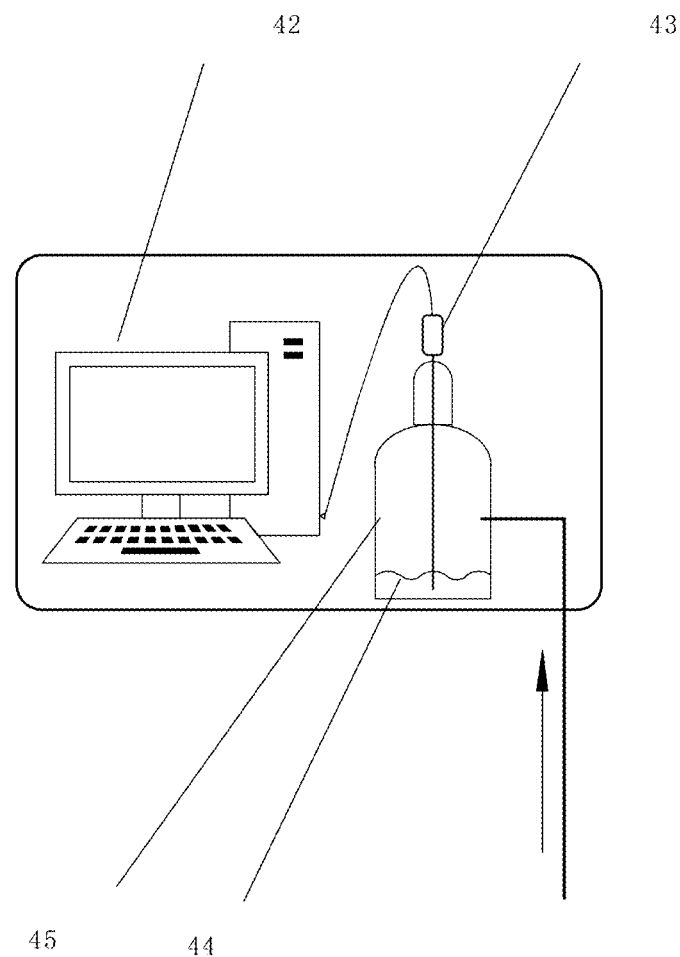

FIG. 1 is a schematic structural diagram of the present disclosure.
FIG. 2 is a schematic structural diagram of a crystallization promoting assembly according to the present disclosure.
FIG. 3 is a schematic structural diagram of a concentration detector according to the present disclosure.

DESCRIPTION OF THE EMBODIMENTS

Detailed Description of the Embodiments

The present disclosure will be further described in detail below with reference to specific examples and the accompanying drawings.

Example 1: Referring to FIG. 1 to FIG. 3, the present disclosure provides an internal circulation type clathrate hydrate-based cold storage system, including a chiller 1, a first solution pump 3, a first flow meter 4, a first one-way valve 5, a first two-way valve 6, a second one-way valve 7, a second solution pump 8, a heat exchanger 10, a third one-way valve 11, a fourth one-way valve 12, a second flow meter 13, a system monitor 14, a direct-current power supply and circuit controller 15, a concentration detector 21, a second gas pump 24, a second two-way valve 25, a gas distributor 28, a hydrate-based cold storage tank 29, a gas disturbance generator 31, a first branch pipeline 34, a second branch pipeline 35, a third branch pipeline 36, a fourth branch pipeline 37, and a fifth branch pipeline 38. The direct-current power supply and circuit controller 15 for controlling a system power supply is arranged in the internal circulation type clathrate hydrate-based cold storage system. A heat exchanger 9 is arranged in the heat exchanger 10. The heat exchanger 9 is a finned tube heat exchanger with a fan. An outlet end of the chiller 1 is in communication with an inlet of the heat exchanger 9 through the first branch pipeline 34, and an inlet end of the chiller 1 is in communication with an outlet of the heat exchanger 9 through the second branch pipeline 35. Preferably, the chiller 1 is a single-working-condition chiller. The first solution pump 3, the first flow meter 4, the first one-way valve 5, the second one-way valve 7, and the second solution pump 8 are sequentially arranged on the first branch pipeline 34 along a flow direction of a secondary refrigerant. The third one-way valve 11, the fourth one-way valve 12, and the second flow meter 13 are sequentially arranged on the second branch pipeline 35 along the flow direction of the secondary refrigerant. When cold energy needs to be supplied, the secondary refrigerant may flow between the chiller 1 and the heat exchanger 10 through the first branch pipeline 34 and the second branch pipeline 35 for a circulation. When the secondary refrigerant is conveyed to the heat exchanger 10, the heat exchanger 9 absorbs cold energy and discharges the cold energy through the fan, and then the secondary refrigerant flows back to the chiller 1 to be cooled, thus completing a cold energy supply cycle. Preferably, the secondary refrigerant is an ethylene glycol aqueous solution with a concentration of 30%.

The hydrate-based cold storage tank 29 is a sealed container filled therein with a hydrate-based cold storage working medium. A size of the hydrate-based cold storage tank 29 is preferably 3 m×2.5 m×3 m, and the hydrate-based cold storage working medium accounts for 9/10 of the space in the hydrate-based cold storage tank 29. A coil 33 is arranged in the hydrate-based cold storage tank 29 and immersed in the hydrate-based cold storage working medium. A fin spacing of the coil 33 is preferably 5 cm. The temperature sensor group is arranged in the hydrate-based cold storage tank 29. A terminal of the temperature sensor group is connected to the system monitor 14. The first branch pipeline 34 between the first one-way valve 5 and the second one-way valve 7 is in communication with a first end of the coil 33 through the third branch pipeline 36. The second branch pipeline 35 between the third one-way valve 11 and the fourth one-way valve 12 is in communication with a second end of the coil 33 through the fourth branch pipeline 37. The first two-way valve 6 is arranged on the third branch pipeline 36, and the second two-way valve 25 is arranged on the fourth branch pipeline 37. When the hydrate-based cold storage tank 29 needs to store cold energy, the secondary refrigerant is conveyed to the hydrate-based cold storage tank 29 by the first solution pump 3, and exchanges heat with the hydrate-based cold storage working medium through the coil 33 for a heat exchange, and fully absorbs heat in the hydrate-based cold storage tank 29 for a hydrate-based phase change energy storage. After the heat exchange is completed, the secondary refrigerant flows back to the chiller 1 to be cooled again to complete a cold storage cycle.

When the hydrate-based cold storage tank 29 needs to supply cold energy, the secondary refrigerant in the hydrate-based cold storage tank 29 is pumped by the second solution pump 8 to the heat exchanger 10 sequentially through the first two-way valve 6 and the second one-way valve 7, fully absorbs heat in the heat exchanger 10 through the finned tube heat exchanger 9 with the fan, then flows back to the hydrate-based cold storage tank 29 sequentially through the third one-way valve 11 and the second two-way valve 25, and is cooled again through a heat exchange with the hydrate-based cold storage working medium at a low temperature in the coil 33 to complete a cold energy supply cycle.

The internal circulation type clathrate hydrate-based cold storage system includes a plurality of gas disturbance generators 31 arranged at a bottom of the hydrate-based cold storage tank 29. The fifth branch pipeline 38 is arranged outside the hydrate-based cold storage tank 29. An upper end of the fifth branch pipeline 38 is in communication with a top of an inner wall of the hydrate-based cold storage tank 29. A lower end of the fifth branch pipeline 38 is connected to the gas distributor 28. The gas distributor 28 is connected to the gas disturbance generator 31 arranged in the hydrate-based cold storage tank 29 through a hose. The second gas pump 24 is arranged on the fifth branch pipeline 38. Through the internal circulation design, cold air in the hydrate-based cold storage tank 29 is pumped to the gas distributor 28 by the second gas pump 24, and then distributed to the gas disturbance generator 31 at the bottom for gas disturbance. The arrangement of the gas disturbance generator 31 in the above technical solution can accelerate the hydrate nucleation and improve the cold storage rate. In conventional technical means, outside air needs to be conveyed into the gas disturbance generator 31 to disturb the solution in the hydrate-based cold storage tank 29. The outside air has a high temperature and will absorb heat after being conveyed into the hydrate-based cold storage tank 29, affecting the cold storage rate. To avoid the above problem, the fifth branch pipeline 38, the second gas pump 24, and the gas distributor 28 are designed, so that cold air in the hydrate-based cold storage tank 29 can be directly recycled through internal circulation, thereby preventing heat exchange between outside hot air and the hydrate-based cold storage tank and improving the energy storage efficiency and the cost-effectiveness while accelerating the hydrate nucleation.

Example 2: Compared with Example 1, the system of this example further includes a first pressure sensor 16, a first temperature sensor 17, a second pressure sensor 26, and a second temperature sensor 27. The first pressure sensor 16 and the first temperature sensor 17 are arranged on the third branch pipeline 36 and are located on a side close to the coil 33. The second pressure sensor 26 and the second temperature sensor 27 are arranged on the fourth branch pipeline 37 and are located on a side close to the coil 33. The system monitor 5 can monitor a temperature change and a pressure change before and after heat absorption by the secondary refrigerant through the first pressure sensor 10, the first temperature sensor 11, the second pressure sensor 23, and the second temperature sensor 24, so as to detect the changing temperature difference and pressure difference of the secondary refrigerant in the hydrate-based cold storage tank.

Example 3: Compared with Example 1, the system of this example further includes the concentration detector 21, a solid-liquid separator 22, and an automatic sampler 23. The concentration detector 21 is connected to the solid-liquid separator 22 through a first pipeline. The solid-liquid separator 22 is connected to the automatic sampler 23 through a second pipeline. The automatic sampler 23 is in communication with the hydrate-based cold storage working medium in the hydrate-based cold storage tank 29 through a third pipeline. The automatic sampler 23 is inserted into the hydrate-based cold storage working medium through a thermal insulation pipe, and periodically draws a sample solution 44, which is filtered by the solid-liquid separator 22 and conveyed to the concentration detector 21 for analysis and testing. When the mass fraction of the hydrate in the sample solution 44 is low, an upper cover of the hydrate-based cold storage tank 29 may be manually removed, and an additional amount of the hydrate-based cold storage working medium may be added, to ensure a stable and efficient cold storage process.

Example 4: Compared with Example 3, the concentration detector 21 includes a data acquisition and analysis terminal 42, a concentration measurement probe 43, the sample solution 44, and a test bottle 45. The test bottle 45 is connected to the solid-liquid separator 22 through the first pipeline. The sample solution 44 is placed in the test bottle 45. A first end of the concentration measurement probe 43 is connected to the data acquisition and analysis terminal 42. A second end of the concentration measurement probe 43 is penetrated into the sample solution 44 in the test bottle 45. The data acquisition and analysis terminal 42 can drive the concentration measurement probe 43 to draw the solution sample 44 in the test bottle 45 and measure the solution concentration.

Example 5: Compared with Example 1, the hydrate-based cold storage working medium in the hydrate-based cold storage tank 29 may be selected from the group consisting of an alkane hydrate, a freon hydrate, a carbon dioxide hydrate, a water-soluble organic hydrate, and a mixed hydrate. The alkane hydrate may be methane, cyclopentane, or the like. The freon hydrate may be R134a. The water-soluble organic hydrate may be tetrahydrofuran (THF), tetrabutylammonium bromide (TBAB), tetrabutylphosphonium bromide (TBPB), or the like. The mixed hydrate may be TBAB-CH4, TBAB-THF, or the like. The hydrate-based cold storage working medium is preferably a 40 wt % TBAB solution.

Example 6: A formula for calculating a cold storage capacity in the hydrate-based cold storage tank in the present disclosure is:

$$Q = \rho q_m c \Delta T$$

where $\rho$ is a density of a solution of the secondary refrigerant, $q_m$ is a mass flow rate of the solution of the secondary refrigerant flowing through an inlet and an outlet of the hydrate-based cold storage tank, c is a specific heat capacity of the solution of the secondary refrigerant, and $\Delta T$ is a heat transfer temperature difference of the solution of the secondary refrigerant between the inlet and the outlet of the hydrate-based cold storage tank.

A conventional calculation formula is:

$$Q_1 = mc\Delta T = \rho V c \Delta T$$

where $\rho$ is a density of the hydrate-based cold storage working medium, V is a volume of the hydrate-based cold storage working medium, c is a specific heat capacity of the hydrate-based cold storage working medium, and $\Delta T$ is a temperature difference of the hydrate-based cold storage working medium before and after cold storage.

In the conventional calculation formula, due to the heat transfer between the hydrate-based cold storage tank and the environment during the cold storage process of the hydrate-based cold storage working medium, there are errors in the measured values. Therefore, the heat transfer temperature difference of the solution of the secondary refrigerant between the inlet and the outlet of the hydrate-based cold storage tank is used for calculation to improve the measurement accuracy.

Example 7: Compared with Example 1, the system of this example further includes a crystallization promoting assembly 2. The crystallization promoting assembly 2 is in communication with an interior of the hydrate-based cold storage tank 29 through a fourth pipeline. A first gas pump 20 is arranged on the fourth pipeline between the crystallization promoting assembly 2 and the hydrate-based cold storage tank 29. When the hydrate-based cold storage tank 29 starts to store cold, the secondary refrigerant is conveyed to the hydrate-based cold storage tank 29 by the first solution pump 3, and at this moment, the crystallization promoting assembly 2 introduces hydrate particles 41 into the hydrate-based cold storage tank 29 through the first gas pump 20 at a time, to induce large-scale crystallization of the hydrate to improve the crystallization efficiency, and induce the rapid nucleation of the hydrate-based cold storage working medium to accelerate energy storage.

Example 8: Compared with Example 7, the crystallization promoting assembly 2 includes a thermal insulation cotton 39, a volumetric flask 40, and the hydrate particles 41. Small hydrate particles of about 1 $mm^3$ are contained in the volumetric flask 40. The thermal insulation cotton 39 is wrapped outside the volumetric flask 40. The volumetric flask 40 has a volume of about 250 mL and is in communication with the interior of the hydrate-based cold storage tank 29 through the fourth pipeline.

Example 9: Compared with Example 1, the temperature sensor group arranged in the hydrate-based cold storage tank 29 includes a third temperature sensor 30, a fourth temperature sensor 32, a fifth temperature sensor 18, and a sixth temperature sensor 19. The third temperature sensor 30 is mounted at a bottom of the hydrate-based cold storage tank 29. The fourth temperature sensor 32 is mounted at a central position of the hydrate-based cold storage tank 29. The fifth temperature sensor 18 is mounted in the hydrate-based cold storage tank 29 and close to a wall surface of the hydrate-based cold storage tank 29. The sixth temperature sensor 19 is mounted on a top air side of the hydrate-based cold storage tank 29. The first pressure sensor 16, the first temperature sensor 17, the second pressure sensor 26, and the second temperature sensor 27, and the temperature sensor group are each connected to the system monitor 14 through a temperature-pressure sensor module. The system monitor 14 monitors a temperature change and a pressure change before and after the heat exchange between the secondary refrigerant and the hydrate-based cold storage working medium through the first pressure sensor 16, the first temperature sensor 17, the second pressure sensor 26, and the second temperature sensor 27, and monitors a temperature change of the hydrate-based cold storage working medium in the hydrate-based cold storage tank 29 through the temperature sensor group.

Example 10: An internal circulation type clathrate hydrate-based cold storage method is provided by using the internal circulation type clathrate hydrate-based cold storage system that is obtained by combining the technical solutions of Example 1 to Example 9.

Cold storage stage at night (23:00-7:00):

The chiller 1 provides the secondary refrigerant at a low temperature of 5° C. The secondary refrigerant is an ethylene glycol aqueous solution with a concentration of 30%. The secondary refrigerant is conveyed to the hydrate-based cold storage tank 29 by the first solution pump 3 through the first flow meter 4, the first one-way valve 5, and the first two-way valve 6, and exchanges heat with the hydrate-based cold storage working medium through the coil 33 for a heat exchange and fully absorbs heat in the hydrate-based cold storage tank 29 for a hydrate-based phase change energy storage. After the heat exchange is completed, the secondary refrigerant flows back to the chiller 1 through the second two-way valve 25, the fourth one-way valve 12, and the second flow meter 13 to be cooled to 5° C. again to complete a cold storage cycle. A theoretical energy storage density in the cold storage process is 53 $kW·h/m^3$.

After the cold storage cycle starts, the crystallization promoting assembly 2 introduces 1 g to 2 g of hydrate particles of about 1 $mm^3$ into the hydrate-based cold storage tank 29 through the first gas pump 20 to induce a rapid nucleation of the hydrate-based cold storage working medium, and meanwhile, cold air from the top of the hydrate-based cold storage tank 29 is pumped by the second gas pump 24 to the gas distributor 28 for a gas distribution, then conveyed to the gas disturbance generator 31 for a continuous gas disturbance, and then pumped by the second gas pump 24 again for a gas internal circulation to reduce a loss of cold load and accelerate energy storage. The system monitor 14 monitors a temperature change before and after heat absorption by the secondary refrigerant, a temperature change of the hydrate-based cold storage working medium, and a temperature change in the hydrate-based cold storage tank in real time.

Cold Energy Supply Stage in Daytime:

The present disclosure can realize three cold energy supply modes: cold energy supply by the hydrate-based cold storage tank 29 alone, cold energy supply by the chiller 1 alone, and cold energy supply by the hydrate-based cold storage tank 29 in combination with the chiller 1.

1. Mode of Cold Energy Supply by the Hydrate-Based Cold Storage Tank 29 Alone:

The secondary refrigerant containing ethylene glycol at 5° C. in the hydrate-based cold storage tank 29 is pumped by the second solution pump 8 to the heat exchanger 10 through the first two-way valve 6 and the second one-way valve 7, fully absorbs heat in the heat exchanger 10 through the finned tube heat exchanger 9 with the fan, then flows back to the hydrate-based cold storage tank 29 through the third one-way valve 11 and the second two-way valve 25, and is cooled again through a heat exchange with the hydrate-based cold storage working medium, i.e., TBAB, at a low temperature in the coil 33 to complete a cold energy supply cycle. This mode is configured for scenarios where the demand for cooling capacity is not large during daytime, and the demand can be met by using cold energy stored in the hydrate-based cold storage tank 29 at night, thereby achieving energy saving and environmental protection, and reducing carbon dioxide emissions.

2. Mode of Cold Energy Supply by the Chiller 1 Alone:

The chiller 1 provides the secondary refrigerant containing ethylene glycol at 5° C. The secondary refrigerant is pumped by the first solution pump 3 to the finned tube heat exchanger 9 in the heat exchanger 10 through the first flow meter 4, the first one-way valve 5, the second one-way valve 7, and the second solution pump 8 for heat absorption, and then flows back to the hydrate-based cold storage tank 29 through the third one-way valve 11, the fourth one-way valve 12, and the second flow meter 13 to be cooled to 5° C. again to complete a cold energy supply cycle. This mode is configured for scenarios that require uninterrupted cold energy supply throughout the day, and effectively meets the demand for continuous cold energy supply after the end of hydrate-based cold energy supply, thereby realizing continuous cold energy supply.

3. Mode of Cold Energy Supply by the Hydrate-Based Cold Storage Tank 29 in Combination with the Chiller 1:

The chiller 1 and the hydrate-based cold storage tank 29 simultaneously provide the secondary refrigerant containing ethylene glycol at 5° C. The secondary refrigerant is pumped by the first solution pump 3 and the second solution pump 8 to the heat exchanger 10. The finned tube heat exchanger 9 with the fan operates at full load to allow the secondary refrigerant at a low temperature to fully absorb heat in the heat exchanger 10. Then, a part of the secondary refrigerant flows back to the hydrate-based cold storage tank 29 and is cooled to a low temperature again through a heat exchange with the TBAB hydrate at a low temperature through the coil 33, and the other part of the secondary refrigerant flows back to the chiller 1 and is cooled to 5° C. again to complete a combined cold energy supply cycle. This mode is configured for scenarios with large cooling capacity demand. The combined cold energy supply by the hydrate-based cold storage tank in combination with the chiller ensures sufficient supply of cold energy. Thereby, the cold energy supply burden of the chiller is alleviated while achieving environmental protection and carbon emission reduction.

What is claimed is:

1. An internal circulation type clathrate hydrate-based cold storage system, characterized by comprising a chiller (1), a first solution pump (3), a first flow meter (4), a first one-way valve (5), a first two-way valve (6), a second one-way valve (7), a second solution pump (8), a heat exchanger (10), a third one-way valve (11), a fourth one-way valve (12), a second flow meter (13), a system monitor (14), a direct-current power supply and circuit controller (15), a concentration detector (21), a second gas pump (24), a second two-way valve (25), a gas distributor (28), a hydrate-based cold storage tank (29), a gas disturbance generator (31), a first branch pipeline (34), a second branch pipeline (35), a third branch pipeline (36), a fourth branch pipeline (37), a fifth branch pipeline (38), and a temperature sensor group, wherein an outlet end of the chiller (1) is in communication with an inlet of the heat exchanger (10) through the first branch pipeline (34), and an inlet end of the chiller (1) is in communication with an outlet of the heat exchanger (10) through the second branch pipeline (35); the first solution pump (3), the first flow meter (4), the first one-way valve (5), the second one-way valve (7), and the second solution pump (8) are sequentially arranged on the first branch pipeline (34) along a flow direction of a secondary refrigerant; the third one-way valve (11), the fourth one-way valve (12), and the second flow meter (13) are sequentially arranged on the second branch pipeline (35) along the flow direction of the secondary refrigerant;

the hydrate-based cold storage tank (29) is a sealed container filled therein with a hydrate-based cold storage working medium, and a coil (33) is arranged in the hydrate-based cold storage tank (29) and immersed in the hydrate-based cold storage working medium; the temperature sensor group is arranged in the hydrate-based cold storage tank (29), and a terminal of the temperature sensor group is connected to the system monitor (14); the first branch pipeline (34) between the first one-way valve (5) and the second one-way valve (7) is in communication with a first end of the coil (33) through the third branch pipeline (36), and the second branch pipeline (35) between the third one-way valve (11) and the fourth one-way valve (12) is in communication with a second end of the coil (33) through the fourth branch pipeline (37); the first two-way valve (6) is arranged on the third branch pipeline (36), and the second two-way valve (25) is arranged on the fourth branch pipeline (37);

the fifth branch pipeline (38) is arranged outside the hydrate-based cold storage tank (29), an upper end of the fifth branch pipeline (38) is in communication with a top of an inner wall of the hydrate-based cold storage tank (29), a lower end of the fifth branch pipeline (38) is connected to the gas distributor (28), the gas distributor (28) is connected to the gas disturbance generator (31) arranged in the hydrate-based cold storage tank (29) through a hose, the second gas pump (24) is arranged on the fifth branch pipeline (38), and the fifth branch pipeline (38) is a thermal insulation pipe; and a heat exchanger (9) is arranged in the heat exchanger (10); and the direct-current power supply and circuit controller (15) for controlling a system power supply is arranged in the internal circulation type clathrate hydrate-based cold storage system.

2. The internal circulation type clathrate hydrate-based cold storage system according to claim 1, characterized by further comprising a first pressure sensor (16), a first temperature sensor (17), a second pressure sensor (26), and a second temperature sensor (27), wherein the first pressure sensor (16) and the first temperature sensor (17) are arranged on the third branch pipeline (36) and are located on a side close to the coil (33); the second pressure sensor (26) and the second temperature sensor (27) are arranged on the fourth branch pipeline (37) and are located on a side close to the coil (33); and the first pressure sensor (16), the first temperature sensor (17), the second pressure sensor (26), and the second temperature sensor (27) are each connected to the system monitor (14) through a temperature-pressure sensor module.

3. The internal circulation type clathrate hydrate-based cold storage system according to claim 1, characterized by further comprising the concentration detector (21), a solid-liquid separator (22), and an automatic sampler (23), wherein the concentration detector (21) is connected to the solid-liquid separator (22) through a first pipeline, the solid-liquid separator (22) is connected to the automatic sampler (23) through a second pipeline, and the automatic sampler (23) is in communication with the hydrate-based cold storage working medium in the hydrate-based cold storage tank (29) through a third pipeline.

4. The internal circulation type clathrate hydrate-based cold storage system according to claim 3, characterized in that the concentration detector (21) comprises a data acquisition and analysis terminal (42), a concentration measurement probe (43), a sample solution (44), and a test bottle (45), wherein the test bottle (45) is connected to the solid-liquid separator (22) through the first pipeline, the sample solution (44) is placed in the test bottle (45), a first end of the concentration measurement probe (43) is connected to the data acquisition and analysis terminal (42), and a second end of the concentration measurement probe (43) is penetrated into the sample solution (44) in the test bottle (45).

5. The internal circulation type clathrate hydrate-based cold storage system according to claim 1, characterized in that the hydrate-based cold storage working medium in the hydrate-based cold storage tank (29) is one selected from a group consisting of an alkane hydrate, a carbon dioxide hydrate, a water-soluble organic hydrate, and a mixed hydrate.

6. The internal circulation type clathrate hydrate-based cold storage system according to claim 1, characterized in that a formula for calculating a cold storage capacity in the hydrate-based cold storage tank (29) is:

$$Q = \rho q_m c \Delta T$$

wherein ρ is a density of a solution of the secondary refrigerant, $q_m$ is a mass flow rate of the solution of the secondary refrigerant flowing through an inlet and an outlet of the hydrate-based cold storage tank, c is a specific heat capacity of the solution of the secondary refrigerant, and ΔT is a heat transfer temperature difference of the solution of the secondary refrigerant between the inlet and the outlet of the hydrate-based cold storage tank.

7. The internal circulation type clathrate hydrate-based cold storage system according to claim 1, characterized by further comprising a crystallization promoting assembly (2) and a first gas pump (20), wherein the crystallization promoting assembly (2) is in communication with an interior of the hydrate-based cold storage tank (29) through a fourth pipeline, and the first gas pump (20) is arranged on the fourth pipeline between the crystallization promoting assembly (2) and the hydrate-based cold storage tank (29).

8. The internal circulation type clathrate hydrate-based cold storage system according to claim 7, characterized in that the crystallization promoting assembly (2) comprises a thermal insulation cotton (39), a volumetric flask (40), and hydrate particles (41), wherein the hydrate particles (41) are contained in the volumetric flask, the thermal insulation cotton (39) is wrapped outside the volumetric flask (40), and the volumetric flask (40) is in communication with the interior of the hydrate-based cold storage tank (29) through the fourth pipeline.

9. The internal circulation type clathrate hydrate-based cold storage system according to claim 1, characterized in that the temperature sensor group arranged in the hydrate-based cold storage tank (29) comprises a third temperature sensor (30), a fourth temperature sensor (32), a fifth temperature sensor (18), and a sixth temperature sensor (19), wherein the third temperature sensor (30) is mounted at a bottom of the hydrate-based cold storage tank (29), the fourth temperature sensor (32) is mounted at a central position of the hydrate-based cold storage tank (29), the fifth temperature sensor (18) is mounted in the hydrate-based cold storage tank (29) and close to a wall surface of the hydrate-based cold storage tank (29), and the sixth temperature sensor (19) is mounted on a top air side of the hydrate-based cold storage tank (29).

10. A cold storage method using a cold storage system, wherein the cold storage system comprises:
a chiller (1), a first solution pump (3), a first flow meter (4), a first one-way valve (5), a first two-way valve (6), a second one-way valve (7), a second solution pump (8), a heat exchanger (10), a third one-way valve (11), a fourth one-way valve (12), a second flow meter (13), a system monitor (14), a direct-current power supply and circuit controller (15), a concentration detector (21), a second gas pump (24), a second two-way valve (25), a gas distributor (28), a hydrate-based cold storage tank (29), a gas disturbance generator (31), a first branch pipeline (34), a second branch pipeline (35), a third branch pipeline (36), a fourth branch pipeline (37), a fifth branch pipeline (38), and a temperature sensor group, wherein
an outlet end of the chiller (1) is in communication with an inlet of the heat exchanger (10) through the first branch pipeline (34), and an inlet end of the chiller (1) is in communication with an outlet of the heat exchanger (10) through the second branch pipeline (35); the first solution pump (3), the first flow meter (4), the first one-way valve (5), the second one-way valve (7), and the second solution pump (8) are sequentially arranged on the first branch pipeline (34) along a flow direction of a secondary refrigerant; the third one-way valve (11), the fourth one-way valve (12), and the second flow meter (13) are sequentially arranged on the second branch pipeline (35) along the flow direction of the secondary refrigerant;
the hydrate-based cold storage tank (29) is a sealed container filled therein with a hydrate-based cold storage working medium, and a coil (33) is arranged in the hydrate-based cold storage tank (29) and immersed in the hydrate-based cold storage working medium; the temperature sensor group is arranged in the hydrate-based cold storage tank (29), and a terminal of the temperature sensor group is connected to the system monitor (14); the first branch pipeline (34) between the first one-way valve (5) and the second one-way valve (7) is in communication with a first end of the coil (33) through the third branch pipeline (36), and the second branch pipeline (35) between the third one-way valve (11) and the fourth one-way valve (12) is in communication with a second end of the coil (33) through the fourth branch pipeline (37); the first two-way valve (6) is arranged on the third branch pipeline (36), and the second two-way valve (25) is arranged on the fourth branch pipeline (37);
the fifth branch pipeline (38) is arranged outside the hydrate-based cold storage tank (29), an upper end of the fifth branch pipeline (38) is in communication with a top of an inner wall of the hydrate-based cold storage tank (29), a lower end of the fifth branch pipeline (38) is connected to the gas distributor (28), the gas distributor (28) is connected to the gas disturbance generator (31) arranged in the hydrate-based cold storage tank (29) through a hose, the second gas pump (24) is arranged on the fifth branch pipeline (38), and the fifth branch pipeline (38) is a thermal insulation pipe; and
a heat exchanger (9) is arranged in the heat exchanger (10); and the direct-current power supply and circuit controller (15) for controlling a system power supply is arranged in the internal circulation type clathrate hydrate-based cold storage system;
wherein the method comprises storing cold energy at night, the chiller (1) providing the secondary refrigerant at a low temperature, and the secondary refrigerant being conveyed by the first solution pump (3) to the hydrate-based cold storage tank (29) through the first flow meter (4), the first one-way valve (5), and the first two-way valve (6), and exchanging heat with the hydrate-based cold storage working medium through the coil (33) for a heat exchange and fully absorbing the heat in the hydrate-based cold storage tank (29) for a hydrate-based phase change energy storage; after the heat exchange being completed, the secondary refrigerant flowing back to the chiller (1) through the second two-way valve (25), the fourth one-way valve (12), and the second flow meter (13), and being cooled again to complete a cold storage cycle; after the cold storage cycle starting, the crystallization promoting assembly (2) introducing hydrate particles into the hydrate-based cold storage tank (29) through the first gas pump (20) to induce a rapid nucleation of the hydrate-based cold storage working medium, and meanwhile, cold air from a top of the hydrate-based cold storage tank (29) being pumped by the second gas pump (24) to the gas distributor (28) for a gas distribution, then being conveyed to the gas disturbance generator (31) for a continuous gas disturbance, and then being pumped by the second gas pump (24) again for a gas internal circulation to reduce a loss of a cold load and accelerate an energy storage; the system monitor (14) monitoring a temperature change before and after absorbing the heat by the secondary refrigerant, a temperature change of the hydrate-based cold storage working medium, and a temperature change in the hydrate-based cold storage tank (29) in real time; and wherein the method further comprises supplying cold energy in daytime using one of a first mode, a second mode or a third mode, wherein:

in the first mode, the secondary refrigerant in the hydrate-based cold storage tank (29) being pumped by the second solution pump (8) to the heat exchanger (10) through the first two-way valve (6) and the second one-way valve (7), fully absorbing heat in the heat exchanger (10) through a finned tube heat exchanger (9) with a fan, then flowing back to the hydrate-based cold storage tank (29) through the third one-way valve (11) and the second two-way valve (25), and being cooled again through a heat exchange with the hydrate-based cold storage working medium at a low temperature in the coil (33) to complete a cold energy supply cycle;

in the second mode, the chiller (1) providing the secondary refrigerant, and the secondary refrigerant being pumped by the first solution pump (3) to the finned tube heat exchanger (9) in the heat exchanger (10) through the first flow meter (4), the first one-way valve (5), the second one-way valve (7), and the second solution pump (8) for a heat absorption, and then flowing back to the hydrate-based cold storage tank (29) through the third one-way valve (11), the fourth one-way valve (12), and the second flow meter (13) to be cooled again to complete a cold energy supply cycle; and in the third mode, the chiller (1) and the hydrate-based cold storage tank (29) simultaneously providing the secondary refrigerant, the secondary refrigerant being pumped by the first solution pump (3) and the second solution pump (8) to the heat exchanger (10), the finned tube heat exchanger (9) with the fan operating at a full load to allow the secondary refrigerant at a low temperature to fully absorb heat in the heat exchanger (10), then a part of the secondary refrigerant flowing back to the hydrate-based cold storage tank (29) and being cooled to the low temperature again through a heat exchange with the hydrate-based cold storage working medium at the low temperature via the coil (33), and the other part of the secondary refrigerant flowing back to the chiller (1) and being cooled again to complete a combined cold energy supply cycle.

* * * * *